(No Model.)
J. C. DAWES.
BOTTOMLESS MEASURE.
No. 457,498. Patented Aug. 11, 1891.
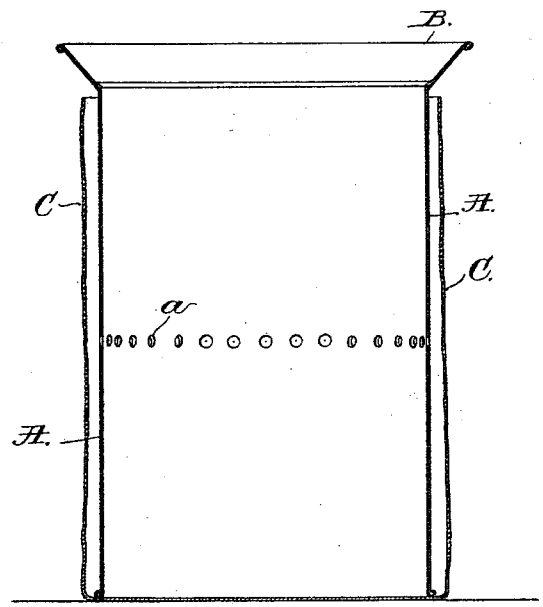
Witnesses:
Edward F. Allen.
Fred S. Greenleaf.
Inventor:
John C. Dawes.
by Crosby & Gregory
Att'ys.

UNITED STATES PATENT OFFICE.

JOHN C. DAWES, OF KINGSTON, ASSIGNOR OF ONE-HALF TO WILLIAM A. RUSSELL, OF BOSTON, MASSACHUSETTS.

BOTTOMLESS MEASURE.

SPECIFICATION forming part of Letters Patent No. 457,498, dated August 11, 1891.

Application filed February 26, 1891. Serial No. 382,852. (No model.)

*To all whom it may concern:*

Be it known that I, JOHN C. DAWES, of Kingston, county of Plymouth, State of Massachusetts, have invented an Improvement in Measures, of which the following description, in connection with the accompanying drawings, is a specification, like letters on the drawing representing like parts.

This invention relates to what is known as "dry measures," my improved measure being especially adapted for use by market-men, provision dealers, &c. In accordance with my invention, the measure without a bottom is set into the bag or basket to be taken by the purchaser, and the material to be measured and sold is filled into the measure to the proper point and then the measure is lifted out vertically, leaving the measured contents in the bag or basket. The measure shown has a funnel-shaped top and is perforated with a series of holes to designate, say, the half-peck point, supposing the measure to be a peck-measure.

The drawing in vertical section shows my improved measure set into a bag to receive the measured material.

My improved measure is composed of a bottomless body A, having a flaring or funnel-like top B. Preferably the material constituting the measure will be tin.

The measure shown is provided midway the ends of its body with a series of holes *a*, which permit light to pass through sufficiently to show the person using the measure when the material being put therein reaches that point.

The measure shown is considered to be a peck-measure, and the row of holes constitute a half-peck mark. The measure may have any desired number of rows of holes to designate any desired subdivision.

The measure is shown as set into a bag C, and when the material to be measured has been filled into the measure to the desired or proper point the measure will be lifted vertically from the bag, leaving the contents of the measure in the bag. This plan is much easier, neater, and time-saving, as compared with the use of a measure having a bottom and into which the material to be measured is put and then poured out into the bag. The holes constitute a division-mark or scale.

I claim—

1. A bottomless measure having a division or scale mark consisting of holes, substantially as described.

2. A bottomless measure consisting of a body provided with a flaring or funnel top and a division or scale mark, substantially as described.

In testimony whereof I have signed my name to this specification in the presence of two subscribing witnesses.

JOHN C. DAWES.

Witnesses:
 MARY R. ADAMS,
 CHARLOTTE G. ADAMS.